May 10, 1932.  G. RIEPER  1,857,742

PICTURE TELEGRAPHY CIRCUIT

Filed Oct. 8, 1930

INVENTOR
GERHARD RIEPER
BY
ATTORNEY

Patented May 10, 1932

1,857,742

UNITED STATES PATENT OFFICE

GERHARD RIEPER, OF LEIPZIG, GERMANY, ASSIGNOR TO SIEMENS & HALSKE, AKTIEN-GESELLSCHAFT, OF SIEMENSSTADT, NEAR BERLIN, GERMANY, A CORPORATION OF GERMANY

PICTURE TELEGRAPHY CIRCUIT

Application filed October 8, 1930, Serial No. 487,118, and in Germany August 29, 1929.

The invention relates to a circuit arrangement for apparatus for use in picture telegraphy systems or the like which are provided with devices for the start-stop type of synchronizing.

If, for instance, from a net of senders pictures are to be transmitted by telegraph or radio to a plurality of subscribers, a number of the transmitters as well as the receivers may be operated from alternating current supply lines and equipped with synchronous motors and other parts of the system may be operated from D. C. supply lines and equipped with D. C. motors. The only stipulation is that from each and any receiver a connection may be established with each transmitter with the result that there appear the following five possibilities of combination:

1. Assume a case where the transmitter system is provided with a synchronous motor for driving the picture apparatus. Then (a) The receiver also may be provided with a synchronous motor which is connected to the same supply network as the transmitting motor;

(b) The receiver may also be provided with a synchronous motor but this motor may be connected in a supply network different from the transmitting motor network; and, (c) The receiver may be provided with a D. C. motor.

2. Assume a case where the transmitter system is provided with a D. C. motor for driving the picture apparatus. Then (a) The receiver may be provided with a synchronous motor for driving the receiver apparatus; and, (b) The receiver apparatus may also be provided with a D. C. motor.

In the cases 1b, 1c, 2a and 2b above named the usual start-stop synchronizing methods may be used, but in the case 1a, however, start-stop synchronization would disturb the already existing synchronism, for the reason that the receiving drum would then participate only in each second revolution of the transmitting drum because it has no lead relative to the transmitting drum so that the synchronizing marks could not be effective at the correct time. Hence, the start-stop synchronizing is modified by the present invention in such manner that, with the use of synchronous motors at the receiver which are connected to the same net as the transmitting motor, it effects at the beginning of the transmission the phase-correct coupling and at the end the automatic stopping of the receiver drum without producing, during the transmission proper, disturbing braking actions.

Figure 1:
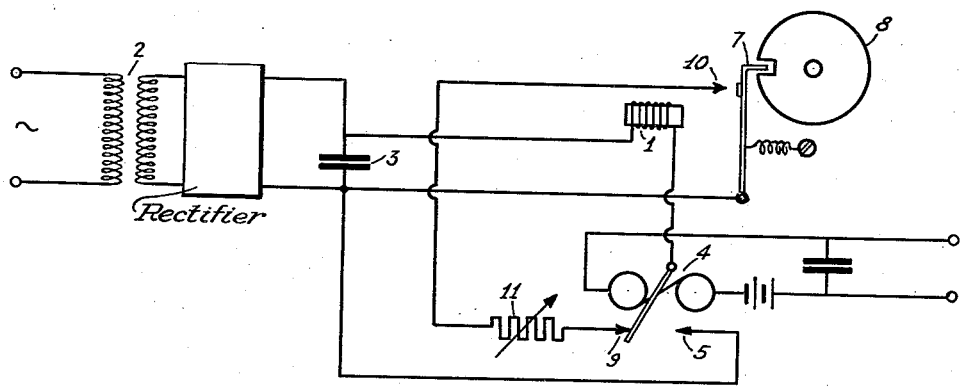
Figure 2A:
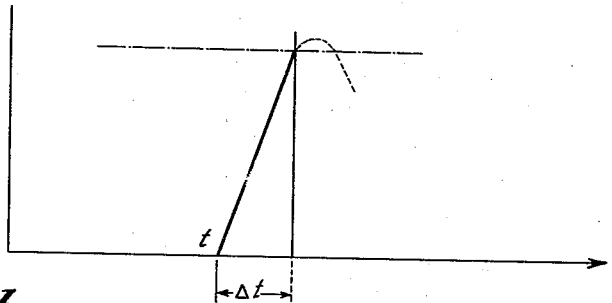
Figure 2B:
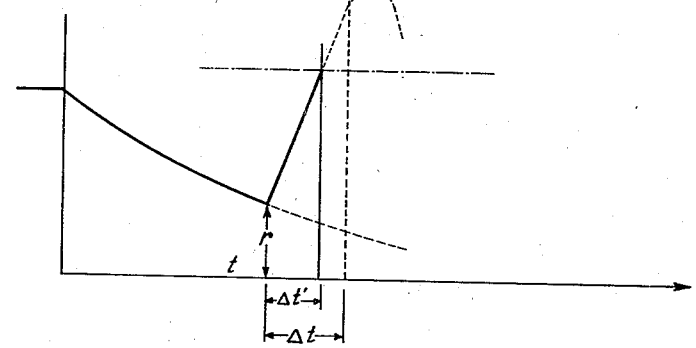

In what follows the invention will be explained in more detail in an embodiment, by way of example, such as has been illustrated in the accompanying drawings, wherein:

Fig. 1 shows one form of the circuit and system according to the disclosure; and Figs. 2a and 2b are curves illustrating the operation of the system of Fig. 1.

Now, referring to the drawing, the current source 2 for the local circuit is represented conventionally as a rectifier which is supplied with energy from an A. C. supply line and whose output is connected in parallel with a condenser 3. Numeral 8 represents the picture drum or, where desired, a disk rigidly connected with the picture drum. The drum 8 is provided with a groove or slot on the circumference which may be engaged by the ratchet pawl 7 of the ratchet relay 1. The ratchet relay 1 may receive current via two different ways; in the first place by means of the synchronizing signals coming from the transmitter which signals reverse the synchronizing relay 4, set for one side, from the contact 9 to the contact 5; and in the second place through contacts 9 and 10. The contact 10 is always closed if the pawl 7 is located outside the groove, hence, the winding of the ratchet relay is continuously traversed by current as long as the contact 9 is not held open by the synchronizing signals. This current, which shall be designated in what follows as permanent current in contrast to the impulses released by the synchronizing signals, is adjusted with the aid of resistance 11 in such a manner that it is located as closely as possible under the responding current of the ratchet relay 1.

When using non-synchronous motors the arrangement operates according to the well known start-stop principle: The receiving drum receives relative to the transmitting drum a suitably calculated lead so that the ratchet pawl 7 engages the groove always prior to the arrival of the synchronizing signal. The synchronizing signal closes, by the reversal of the relay 4 from contact 9 to contact 5, the circuit of the ratchet relay with the result that the drum is released again. By means of the condenser 3 there is caused in the known manner an acceleration of the switching-in action.

When operating with synchronous motors care must be taken that the ratchet pawl may not drop into the groove. This is accomplished according to the invention in that, with the aid of the above mentioned permanent current circuit, the release of the second and of all following starting impulses takes place a little ahead of time with respect to the first one. Thus the time moments during which the groove passes the ratchet pawl are determined unequivocally for the entire duration of the transmission by means of the first starting impulse in connection with the synchronism already existing as such, and all further starting impulses arrive, with respect to these time moments, a little ahead of time with the result that the ratchet relay has already at the critical time moments its full pulling power and, therefore, prevents the pawl from engaging.

From the herein described embodiment, by way of example, follows the following mode of operation: The pawl 7 is located in the groove on the picture drum 8. There elapses, after the arrival of the first synchronizing signal, a certain time $t$, as has been graphically shown by Fig. 2a, until the relay 4 is reversed to contact 5. When this has occurred the condenser 3 gives a discharge impulse through the ratchet relay; after a certain very short time $\Delta t$ the responding current of the ratchet relay is reached so that there elapses from the moment of the arrival of the synchronizing signal until to the release of the receiving drum a total time of $t + \Delta t$. After the arrival of the second synchronizing sign the synchronizing relay is again reversed in the time $t$ with the result that during this time both local circuits are open. Now, the ratchet relay is provided with some means or other which cause a retarded fading out of the magnetic field, which has been graphically represented by Fig. 2b; this may for instance take place by means of a number of short-circuit windings wherein there is generated by the switching-out impulse an induction impulse which still maintains the magnetic field for a certain length of time. This residual value $r$ of the magnetic field is now superimposed on the field of the condenser discharge starting at the time $t$ so that now the winding obtains its full pulling force not merely at the time $t + \Delta t$, but at the time $t + \Delta t'$, hence, with respect to the first starting impulse so much earlier as was required at the first synchronizing signal for the building up of the residual field, now still in existence due to the permanent current circuit. Thereby the stipulation, considered in the above as necessary, is sufficed since at the time $t + \Delta t'$, when the groove passes the pawl, the pawl 7 is already held fast by the relay winding 1 so that it can no longer engage. These actions now continue periodically until at the end of the transmission the synchronizing signals stop. When this occurs there flows through the ratchet relay, while the groove is located under the pawl, only the permanent current through contact 10 and resistance 11 so that the responding value of the relay is no longer reached. Consequently the receiving drum is automatically stopped and is disposed in the position necessary for the next operation of the phase-correct coupling system to reproduce another picture subject.

Having now described my invention, I claim:

1. In a synchronizing system for picture receiving apparatus, a record drum having a slot in one end thereof, a start-stop relay system having an armature adapted to rest in said slot at predetermined time intervals, means for continually supplying current of predetermined strength to said start-stop relay, a capacity element shunting said current supply and adapted to be charged during the periods between successive operations of said start-stop relay, and a synchronizing relay responsive to received synchronizing impulses coordinated with said start-stop relay for causing a discharge of the energy stored in said capacity element and thereby producing an operation of said start-stop relay armature so as to disengage the armature from the slot in said record carrying drum.

2. In a synchronizing system for picture receiving apparatus, a start-stop relay system having an armature adapted to normally rest in a slot on the record receiving drum, means for continually passing current of a strength slightly less than that required for operation of said start-stop relay through said relay, an electrical storing element connected across said current supply, a synchronizing relay cooperating with said start-stop relay, and means responsive to incoming synchronizing signal impulses for producing an operation of said synchronizing relay whereby said storing element is discharged and the start-stop armature is disengaged from said slot.

3. In a synchronizing system for picture receiving apparatus, a start-stop relay system having an armature adapted to rest in a slot in the record carrying drum at predetermined intervals, means for supplying current of a strength less than that required for operation of said relay during periods between the receipt of synchronizing signalling impulses, a synchronizing relay cooperating with said start-stop relay and having its armature connected with the winding of said start-stop relay, a resistor for regulating the current flow through said start-stop relay during periods between the receipt of synchronizing signalling impulses upon said synchronizing relay, a capacity element for storing a charge for accentuating the operation of said start-stop relay, and means provided by said synchronizing relay at the time of receiving synchronizing signalling impulses for causing a discharge of said capacity through said start-stop relay for maintaining said start-stop relay armature in retracted position with respect to the slot on said record drum.

In testimony whereof I affix my signature.

GERHARD RIEPER.